F. W. MOORE.
BOBBIN STRIPPER FOR WEFT REPLENISHING LOOMS.
APPLICATION FILED DEC. 23, 1908.
Reissued May 31, 1910. 13,119.
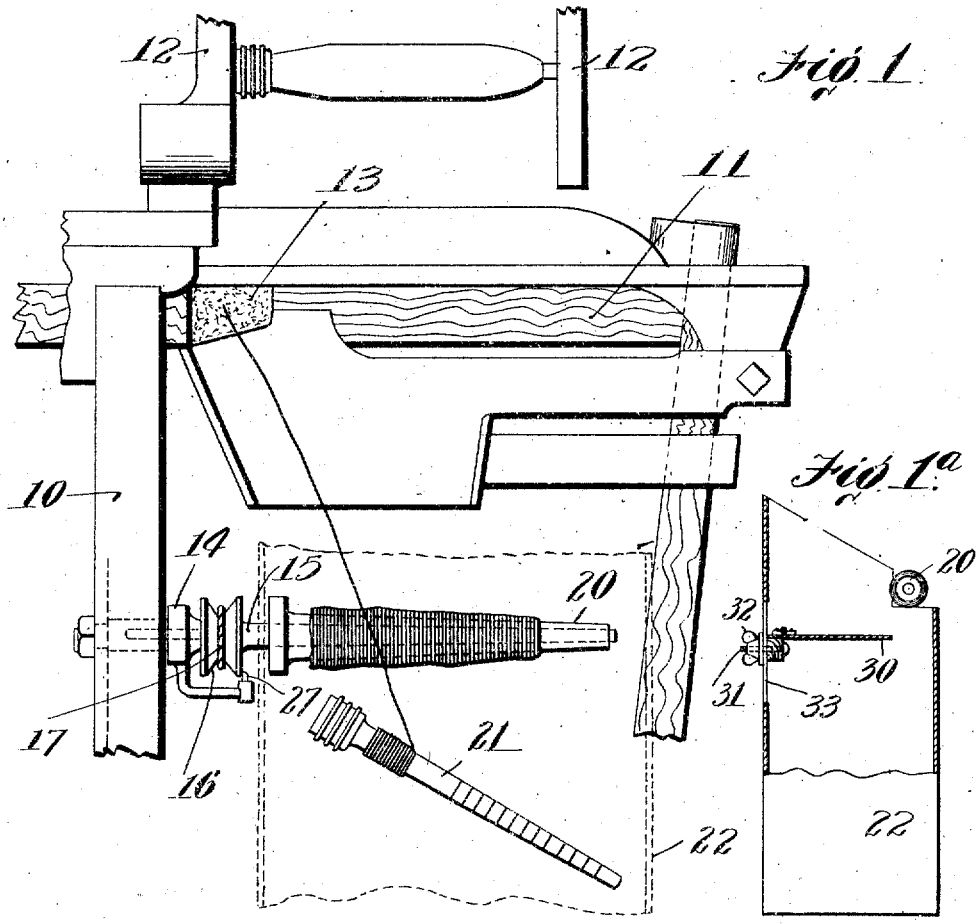
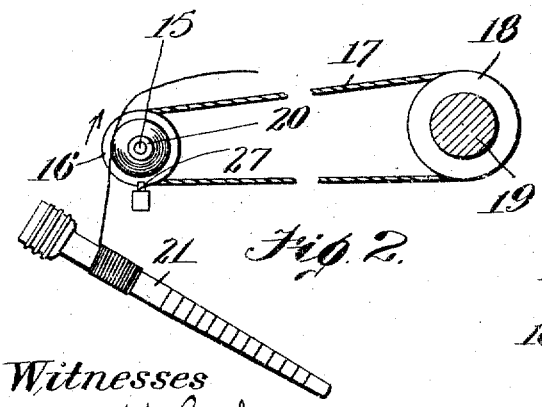
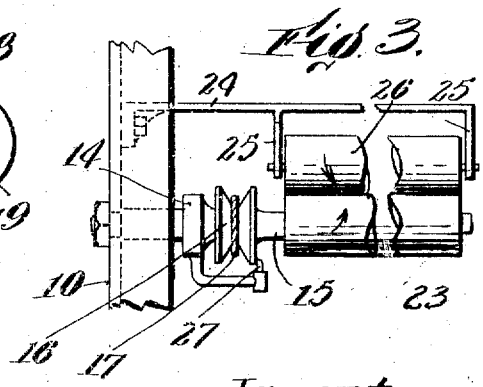
Witnesses
Eugene W. Bond
Frank A. Peters.
Inventor
Frederic W. Moore
by Arthur S. Browne
his Attorney

UNITED STATES PATENT OFFICE.

FREDERIC W. MOORE, OF MILLBURY, MASSACHUSETTS, ASSIGNOR TO DRAPER COMPANY, OF HOPEDALE, MASSACHUSETTS, A CORPORATION OF MAINE.

BOBBIN-STRIPPER FOR WEFT-REPLENISHING LOOMS.

13,119. Specification of Reissued Letters Patent. Reissued May 31, 1910.

Original No. 890,865, dated June 16, 1908, Serial No. 368,180. Application for reissue filed December 23, 1908. Serial No. 469,031.

*To all whom it may concern:*

Be it known that I, FREDERIC W. MOORE, a citizen of the United States, residing at Millbury, in the county of Worcester and State of Massachusetts, have invented a new and useful Bobbin-Stripper for Weft-Replenishing Looms, of which the following is a specification.

This invention relates to weft-replenishing looms. In order that mispicks may be avoided in weaving cloth, practically every bobbin which is used is discharged from the shuttle with more or less yarn thereon. In order that the bobbins may be used over again, this yarn is usually removed by hand. The operation of removing it, consists of grasping the part of the bobbin on which the yarn is held and striking the small end of the bobbin on a bench or other stationary surface. This not only takes time, and in a large mill results in some little expense for labor, but it results in injury to the bobbins. In many cases, moreover, the yarn cannot be removed in this way on account of the corrugations on the bobbin, and it has to be cut therefrom. This obviously injures the bobbins.

The principal object of this invention is to provide a practical means whereby the yarn will be unwound from the bobbins as they are discharged from the shuttle. This is accomplished by mounting in some convenient position, preferably on the end of the frame, a rotating bobbin-stripper adapted to engage the end of the yarn which usually hangs from the bobbin when the same is discharged. This bobbin-stripper rotates and winds the yarn upon itself, removing it from the bobbin. This is done partly when the bobbin is falling, and is completed after the bobbin reaches the can or other receptacle into which it is discharged. In order to assist in this operation and retard the end of the yarn so that it may be more surely engaged by the bobbin stripper, a clearer cloth is preferably mounted on the lay or in some other convenient position. If the yarn engages this cloth, the fibers of the cloth become entangled to a slight extent with the threads of the yarn and hold the same back so that it will insure the yarn engaging the bobbin-stripper long enough to get wound thereon in one or two turns, so that the fall of the bobbin will not release the yarn from the stripper.

Another feature of this invention is the provision of means whereby the bobbin is temporarily held in proper position for the stripper to act, instead of falling at once to the bottom of the can.

Reference is to be had to the accompanying drawings which illustrate preferred forms of the invention, and in which—

Figure 1 is a fragmentary elevation of the end of an automatic loom showing one form of stripper therefor. Fig. 1[a] is a side view partly in section of the improved can for the bobbin. Fig. 2 is an end elevation partly in section of a portion of the stripper showing how it may be driven from the main shaft, and Fig. 3 is a side elevation of another form in which the invention can be constructed.

Only a few parts of the loom are illustrated as it is obvious that the invention may be applied to practically all forms of weft-replenishing looms for use in the textile industry.

Fig. 1 shows a portion of the end frame 10, the lay 11, and a part of the magazine or battery 12. On the lay is mounted a clearer cloth 13, while on the frame is mounted a bracket 14 carrying a spindle 15. This spindle is provided with a pulley 16 which by means of a rope or belt 17 is operated from the pulley 18 on the main shaft 19, but it is to be understood that it can be turned in any desired way.

The spindle is of a convenient size and shape for the reception of a bobbin 20. This bobbin may be of the ordinary character, or it may be provided with a surface of cloth or other material to adapt it more readily to hold the yarn as it passes it, but obviously after one layer of yarn is wound upon it, the yarn itself will perform this function.

In operation the bobbins 21 are discharged from the shuttle over the lay in such a manner that most of the ends of the yarn which remain upon them will engage the clearer cloth. This holds the ends back so that there will be little danger of the yarn failing to engage the bobbin 20, but in any event most of the yarn engages this bobbin, and as it is rotated at a considerable speed, one or two turns of yarn will be wound upon it before the fall of the bobbin 21 can draw the yarn beyond it. After this has been accomplished, the continued rotation of the spindle will wind the remainder of the yarn from the bobbin 21 either before or after it falls into the receptacle 22.

The device can be constructed in many ways as I am aware without departing from the scope of the invention as expressed in the claims. One of these forms is shown in Fig. 3, in which instead of placing a bobbin on the spindle 15, a roll 23 is mounted thereon. On a frame 24 which has slotted arms 25, a second roller 26 is mounted. This roller moves by gravity along the slots in said arms into contact with the roller 23, and when the end of the yarn from a bobbin has once passed between the rollers it will be kept there long enough to be wound on the roller 23. In either event the pulley 16 is preferably provided with a guide 27 for holding it in position.

When the roller 23 or the bobbin 20 is filled with yarn it can be removed and replaced by another or stripped in any desired way.

When the bobbins are discharged into a deep can, some of them pass the stripper in such a way that the yarn is not caught by it, and when a shallow can is used it soon fills up. In order to avoid both difficulties the invention preferably is carried out with a can having a shelf 30 extending from one side nearly to the other so that as the bobbins are discharged on the shelf they are in proper position for the end of the yarn to be engaged by the stripper and when the yarn unwinds the bobbins roll to the edge of the shelf and drop off. They are retained on the shelf long enough for the stripper to wind up enough yarn to secure a firm hold.

It is to be observed that there is an unobstructed space between the shuttle and the can, whereby the bobbin may drop down without hitting any surface to cause it to turn or wind up the yarn thereon, except the clearer-cloth and the stripper, the functions of which have been explained.

In order that the shelf may be turned up to permit the bobbins to be removed it is hinged to the can. It is also shown as adjusted so that it may be placed at the proper distance below the stripper to act efficiently with different kinds of bobbins and yarn. This may be accomplished in any desired way. In the drawings the shelf is adjustably connected with the can by screws 31 and thumb nuts 32, the former passing through slots 33 in the wall of the can.

While I have illustrated and described a preferred form of the invention, I am aware that many modifications may be made therein by a skilled mechanic without departing from the scope of the invention as expressed in the claims.

Having thus described my invention what I do claim is:—

1. The combination with a weft replenishing loom, of means mounted on the frame thereof for stripping yarn from the bobbins as they are discharged from the shuttle, and a clearer located in position to engage the loose ends of the yarn to retard the same and lay the yarn upon said stripping means during the descent of the bobbin.

2. The combination with a loom having a frame, a main shaft and a lay, of means operated by the main shaft and mounted on the frame for stripping yarn from the bobbins as they are discharged from the shuttle, and a clearer on the lay for engaging and retarding the end of the yarn on the bobbin.

3. The combination with a loom having a lay, of means on the loom for stripping yarn from the bobbins as they are discharged from the shuttle, and a clearer cloth on the lay for engaging and retarding the ends of the yarn on the bobbins, whereby the same will be brought more surely into contact with the stripping device.

4. The combination with a weft replenishing loom, of a bobbin stripper therefor, and means located in position to engage loose ends of the yarn on the bobbins as they are discharged for retarding said loose ends, said means being so located as to cause said ends to engage said stripper.

5. The combination with a weft replenishing loom, of a yarn stripper for the bobbins thereof comprising a spindle, and a bobbin removably mounted thereon and provided with a cloth surface for engaging the yarn.

6. The combination with a loom, of a bobbin stripper therefor, and a can for receiving the bobbins having a shelf located below said stripper and spaced at its free end from one of the walls of the can, said shelf being hinged so as to swing upwardly.

7. The combination with a loom, of a bobbin stripper therefor and a can for receiving the bobbins, having a swinging adjustable shelf at a lower level than said stripper and in position to act as a temporary obstruction for the falling bobbin spaced at its free end from the wall of the can whereby a space is provided through which the bobbin may fall when the shelf is in horizontal position.

8. The combination with a weft replenishing loom, of a bobbin stripper, and a receiving can, said stripper being located immediately above the top of the can which is provided with an open top, the space between which and the adjacent shuttle-box of the loom is unobstructed.

9. The combination with a weft replenishing loom, having a battery, of a bobbin stripper, and a receiving can, said bobbin stripper being located near the side of the can nearest the battery, and the can being provided with a shelf extending from the other side thereof part way across the can below the stripper, and spaced from the can at its free end whereby a space is provided through which the bobbin may fall.

10. The combination with a weft replenishing loom having a battery, of a bobbin stripper, and a receiving can, said bobbin stripper being located near the side of the can nearest the battery, and the can being provided with a shelf extending from the other side thereof part way across the can leaving a clear space under said stripper through which the bobbin may fall, said shelf being located lower than the stripper.

11. The combination with a weft replenishing loom, of a bobbin stripper, a receiving can, and a clearer, the space over which the bobbins pass to the can being unobstructed, the clearer being located in position to engage the ends of the yarn on the bobbins, and the stripper being located between the can and the clearer.

12. The combination with a weft replenishing loom, having a magazine or battery, of a bobbin stripper, and a clearer mounted to move in such path as to intercept the ends of the yarn on the bobbins as they are discharged from the shuttle toward the stripper.

13. A weft replenishing loom having a magazine or battery, and a lay provided with a clearer located in position to engage the loose ends of yarn on the bobbins as they are discharged from the shuttle to retard them and cause the yarn to unwind from the bobbins while they fall.

In testimony whereof I have hereunto set my hand in the presence of two subscribing witnesses.

FREDERIC W. MOORE.

Witnesses:

CHAS. P. CHASE,

E. D. OSGOOD.